United States Patent
Gould et al.

(10) Patent No.: US 8,427,733 B2
(45) Date of Patent: Apr. 23, 2013

(54) ELECTROCHEMICAL DEVICE

(75) Inventors: Nigel Paul Gould, Broadstairs (GB); Fereidoun Abbasi, Broadstairs (GB); Adam Joseph Howard Batting, Broadstairs (GB); Mats Olof Sandberg, Norrköping (SE); Anurak Sawatdee, Norrköping (SE); Lars-Olov Bror Hennerdal, Norrköping (SE); Staffan Nordlinder, Norrköping (SE); Tommi Remonen, Grankulla (FI)

(73) Assignee: Acreo AB, Norrkoping (SE)

( * ) Notice: Subject to any disclaimer, the term of this patent is extended or adjusted under 35 U.S.C. 154(b) by 1448 days.

(21) Appl. No.: 11/830,484

(22) Filed: Jul. 30, 2007

(65) Prior Publication Data
US 2009/0008031 A1 Jan. 8, 2009

(30) Foreign Application Priority Data
Nov. 20, 2006 (GB) .................................. 0623108.8

(51) Int. Cl.
*G02F 1/15* (2006.01)
(52) U.S. Cl.
USPC ........ 359/265; 313/504; 156/275.5; 429/306; 429/307; 429/317
(58) Field of Classification Search .................. 359/265; 156/275.5; 313/504; 429/306, 307, 317
See application file for complete search history.

(56) References Cited

U.S. PATENT DOCUMENTS

| | | | | |
|---|---|---|---|---|
| 5,446,577 A | * | 8/1995 | Bennett et al. | 359/273 |
| 5,754,329 A | * | 5/1998 | Coleman | 359/254 |
| 6,306,509 B2 | * | 10/2001 | Takeuchi et al. | 428/425.8 |
| 6,395,043 B1 | * | 5/2002 | Shadle et al. | 29/623.4 |
| 6,475,663 B1 | * | 11/2002 | Mohwald et al. | 429/129 |
| 6,587,250 B2 | * | 7/2003 | Armgarth et al. | 359/265 |
| 6,642,069 B2 | * | 11/2003 | Armgarth et al. | 438/22 |
| 6,991,874 B1 | * | 1/2006 | Mohwald et al. | 429/129 |
| 7,022,264 B2 | | 4/2006 | Takeuchi et al. | |
| 7,033,706 B2 | * | 4/2006 | Mori et al. | 429/317 |
| 7,119,937 B2 | | 10/2006 | Warner et al. | |
| 7,125,479 B2 | * | 10/2006 | Sotzing | 205/419 |
| 7,158,277 B2 | * | 1/2007 | Berggren et al. | 359/274 |
| 7,347,954 B2 | * | 3/2008 | Banno et al. | 252/62.2 |
| 7,482,620 B2 | | 1/2009 | Kugler et al. | |
| 7,746,533 B2 | * | 6/2010 | Sotzing et al. | 359/265 |
| 2001/0005275 A1 | * | 6/2001 | Ikai et al. | 359/272 |
| 2001/0008458 A1 | * | 7/2001 | Asano et al. | 359/267 |

(Continued)

FOREIGN PATENT DOCUMENTS
WO   WO 03/025953 A1   3/2003
WO   WO 2005/027599 A1   3/2005

*Primary Examiner* — Nimeshkumar Patel
*Assistant Examiner* — Thomas A Hollweg
(74) *Attorney, Agent, or Firm* — Harness, Dickey & Pierce, P.L.C.

(57) ABSTRACT

This invention relates to a printable composition and in particular to a printable composition for application to an electrochromic and/or electrochemical device. The printable electrolyte composition for the production of electrochemical devices comprises: 20-50% by weight, based on the total amount of the composition, of a thermally-curable base which comprises a resin; 20-70% by weight, based on the total amount of the composition, of a solvent; and 10-50% by weight, based on the total amount of the composition, of an electrolyte, wherein the composition has a viscosity of 0.3 Pas or higher.

14 Claims, 4 Drawing Sheets

U.S. PATENT DOCUMENTS

| | | | |
|---|---|---|---|
| 2001/0014420 A1* | 8/2001 | Takeuchi et al. | 429/209 |
| 2004/0074779 A1* | 4/2004 | Sotzing | 205/414 |
| 2004/0076886 A1* | 4/2004 | Mori et al. | 429/306 |
| 2004/0188656 A1* | 9/2004 | Hennerdal et al. | 252/500 |
| 2004/0211989 A1* | 10/2004 | Armgarth et al. | 257/253 |
| 2005/0068603 A1* | 3/2005 | Berggren et al. | 359/265 |
| 2006/0120021 A1* | 6/2006 | Banno et al. | 361/502 |
| 2007/0008603 A1* | 1/2007 | Sotzing et al. | 359/265 |

* cited by examiner

ELECTROCHEMICAL DEVICE

This application claims the benefit of priority under 35 U.S.C. §119 from Great Britain Patent Application No. GB 0623108.8, filed on Nov. 20, 2006, in United Kingdom Intellectual Property Office.

This invention relates to a printable composition and in particular to a printable composition for application to an electrochromic and/or electrochemical device.

Traditionally electronic devices were constructed with inorganic conductors, such as copper, and semi-conductors, such as silicon. However, conductive organic polymers provide advantages in that they are that they are lighter, more flexible and less expensive than inorganic conductors. With organic electronics it is possible to create many of the electronic products already available on the market today as well as some which are entirely new. The present invention is directed to devices incorporating an electrochromic display or other electrochemical components such as a battery, a transistor, a diode or sensor or combination of these components. The device may e.g. be connected to a electric circuitry or chip made of silicon. More particularly, present invention is directed to electrochromic displays and/or electrochemical devices produced by conventional printing techniques.

Conductive polymers are well-known materials typically incorporating a linear chain of conjugated units which becomes highly conductive on doping. Many conjugated polymers can undergo reversible electrochemical oxidation and reduction through the application of a positive or negative bias in the presence of an electrolyte or electrolyte composition. When switching a conjugated polymer between its oxidation and reduction states the fundamental electronic and optical structure of the polymer changes. The electronic structure change makes the conductivity change from e.g. nearly insulating to a conductive material, or vice versa. For electrochromic polymer materials the change in conductivity also provides a change in the optical properties of the polymer, i.e. provides a change in its color (termed electrochromism). This ability makes conjugated polymers a good choice for creating displays. The optical and electronic change of the polymer depends on the material and its doping level.

A wide range of suitable conducting polymers is available, which may or may not be electrochromic. An example is the conducting polymer poly(3,4-ethylenedioxythiophen) doped with poly(styrene sulfonic acid) (PEDOT:PSS). In the reduced state a PEDOT:PSS film has a low conductivity and a deep-blue color; in the oxidized state the conductivity is high and the color nearly transparent.

U.S. Ser. No. 10/819,306 gives basic examples, which describe how electrochemical components such as transistors, displays and logical circuits may be arranged and manufactured using electrochemically active elements of e.g. conductive polymers, and a solidified electrolyte composition. Basically, two elements of electrically conductive and electrochemically active material is arranged adjacent to each other. An electronically insulating gap between the two elements is bridged by an electrolyte. Further, the electrolyte provides ionic contact between the two elements. As a voltage is applied across the electrolyte the conductivity of the electrochemically active material is changed at the interface between the electrolyte and the conductive material. Thus, a current in the electrochemically active material can be controlled by means of a voltage applied to the electrolyte. U.S. Ser. No. 10/495,653 (which corresponds to U.S. Publication No. 2004/0256644 A1, now U.S. Pat. No. 7,482,620 B2) gives further examples of how to arrange and manufacture other components based on the same principle.

In one example of a technique for the manufacture of an electrochromic device, a conducting polymer film is applied to a suitable substrate. A pattern is then formed in the film by irreversibly over oxidising or reducing the conducting polymer in certain defined areas. The thus-treated polymer film is then over-printed with an electrolyte layer and the electrolyte layer is subsequently encapsulated. See US 2005/0068603 for further details.

In the following, one example of how to manufacture an electrochemical component is described. Other well-known techniques for forming an electrochemical device, e.g. without the use of killyte, applying the electrolyte and possibly encapsulating the device may be found in U.S. Ser. No. 10/819,306, U.S. Ser. No. 10/495,653, WO 03/25953 and WO 05/27599. The first step in the printing process is a subtractive patterning technique. Here, a pattern with non-conducting lines is created in the conducting PEDOT:PSS film. These lines define the conducting areas of the display. The typical thickness of the lines is 100-200 μm.

Figure 1:
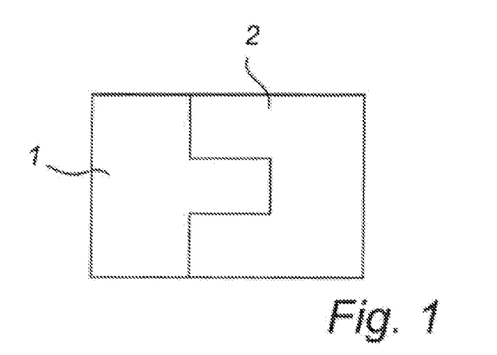
FIG. 1 depicts an electrochemically produced pattern for a one pixel electrochromic display.

FIG. 1 shows the electrochemically produced pattern for a one-pixel electrochromic display. The black lines are the electrochemically produced pattern. The patterning is performed with an electrolyte ink (often termed "killyte"). The killyte is grounded and the PEDOT:PSS film is connected to a power supply (e.g. 150 V). The killyte is then applied to the PEDOT:PSS film using a suitable printing technique, such as screen printing. As the killyte comes in contact with the PEDOT:PSS film, the circuit is closed. The high potential creates a large current which over oxidizes the PEDOT:PSS in an irreversible process. The overoxidation permanently deactivates the conductivity of the PEDOT:PSS areas contacted by the killyte.

The killyte which comes in contact with the substrate during the electrochemical patterning step remains in place in the eventual device. It must therefore be dried or cured into a dry plastic-like film before the next processing step. Curing the killyte also ensures that it will not stick or dry on other pieces of equipment, making the cleaning and maintenance of the press easier. The simplest technique is simply to evaporate the solvent from the active solution, but other techniques, such as thermal or UV curing, may be used instead.

As an alternative to the use of killyte, a conducting polymer film may be printed directly on to the substrate.

Figure 2:
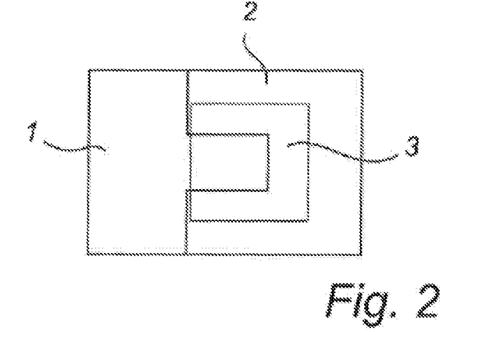
FIG. 2 illustrates the printing of an electrolyte.

In the next step an electrolyte composition is applied to the substrate. This step is performed in a manner similar to the electrochemical patterning. The two main differences are that no voltage is applied and that the electrolyte pattern is considerably larger. FIG. 2 illustrates how the electrolyte 3 (represented by the darker area in FIG. 2) should be printed. I.e. the electrolyte 3 bridges a gap between a first 1 and a second layer 2 of electrochemically active material, such that the two layers are in ionic contact with each other. For good device performance it is important that the electrolyte 3 does not touch the two vertical electrochemical patterning lines to the left.

The substrate is then preferably encapsulated. Encapsulation can be performed on both wet and cured electrolyte. Encapsulation is the last step before cutting the repeated patterns into individual pages. With good encapsulation the display will be protected from external stress. Encapsulation also provides a barrier for protection against dehydration of the electrolyte 3.

Figure 3:
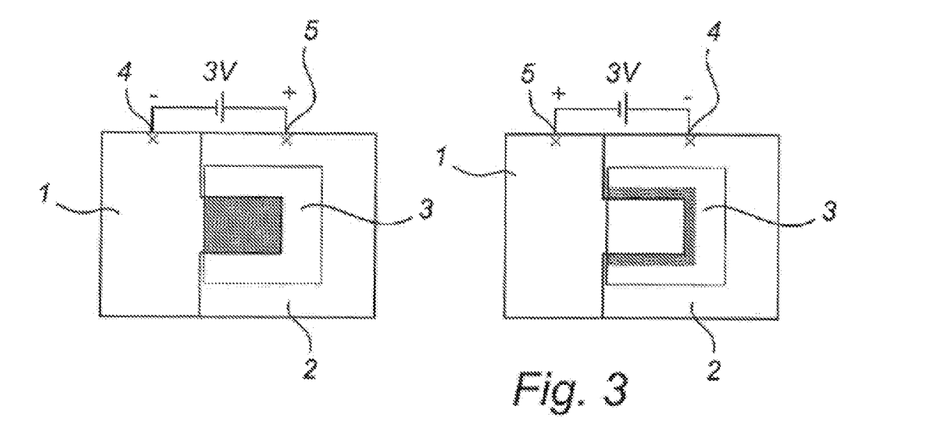
FIG. 3 depicts an electrochemical device.

The electrochemical device or the one-pixel electrochromic display described hereinabove is a simple electrochemical cell containing two PEDOT:PSS electrodes connected via an electrolyte 3. When a potential is applied between the electrodes an electronic current in the electrodes is converted to an ionic current in the electrolyte via electrochemistry occurring at both electrodes at the same time. This current will continue to flow until the electrochemical capacity of one of the electrodes has been consumed. FIG. 3 shows such a device. The PEDOT in the anode 5 (positively addressed here) is further oxidized (from the partially-oxidized initial state) so that it becomes more conductive and optically transparent. On the other hand, the cathode 4 (negatively addressed here) is reduced and becomes less conductive and obtains an opaque deep blue color (shown as the darker areas in FIG. 3). The electrochemical reaction normally starts in a portion of the electrochemically active material where the electrolyte 3 covered separation between the two layers is most narrow, i.e. where the ion path between the two electrochemically active layers is the shortest.

The left-hand picture in FIG. 3 shows the pixel switched the correct or most normal way. The cathode 4 (negatively addressed here) under the electrolyte 3 turns blue due to reduction when a potential of 3 V is applied. When the whole cathode 4 is reduced the electrochemical reaction ceases. By reverting the potential, the ion transport will run in the opposite direction and a switched pixel, as illustrated in FIG. 2, may be switched back to its initial or neutral state; unless the previous reaction has irreversibly oxidized portions of the electrochemically active layer. The right-hand picture shows how the display starts to be colored when the reaction continues from the neutral state when the potential is applied in the reverse direction compared to the situation illustrated in the left-hand picture. In this example, the minimum applied voltage for making a switch is from 0.6 to 0.9 V. The necessary voltage depends e.g. on the selected materials and their sizes.

The electrochromic device described hereinabove has a memory; it is bi-stable. This means that when the potential is removed from the display, it stays switched for up to several hours. The length of the memory time depends on the leakage current between the electrodes. This bi-stability makes it ideal for low-power applications.

Of the two electrolytes used in the process described hereinabove, the second electrolyte must retain its electrolytic function for the lifetime of the device in order for the device to be able to change its electrochemical and/or electrochromic (i.e. optical) state. Throughout the lifetime of the device, therefore, the electrolyte must allow for the confined transport of ions within the device.

By employing the same manufacturing process described hereinabove, it is possible to create other devices, such as transistors, from the same materials as the displays, as is known from e.g. U.S. Ser. No. 10/819,306, U.S. Ser. No. 10/495,653, WO 03/25953 and WO 05/27599, and which will be exemplified below.

Figure 4A:
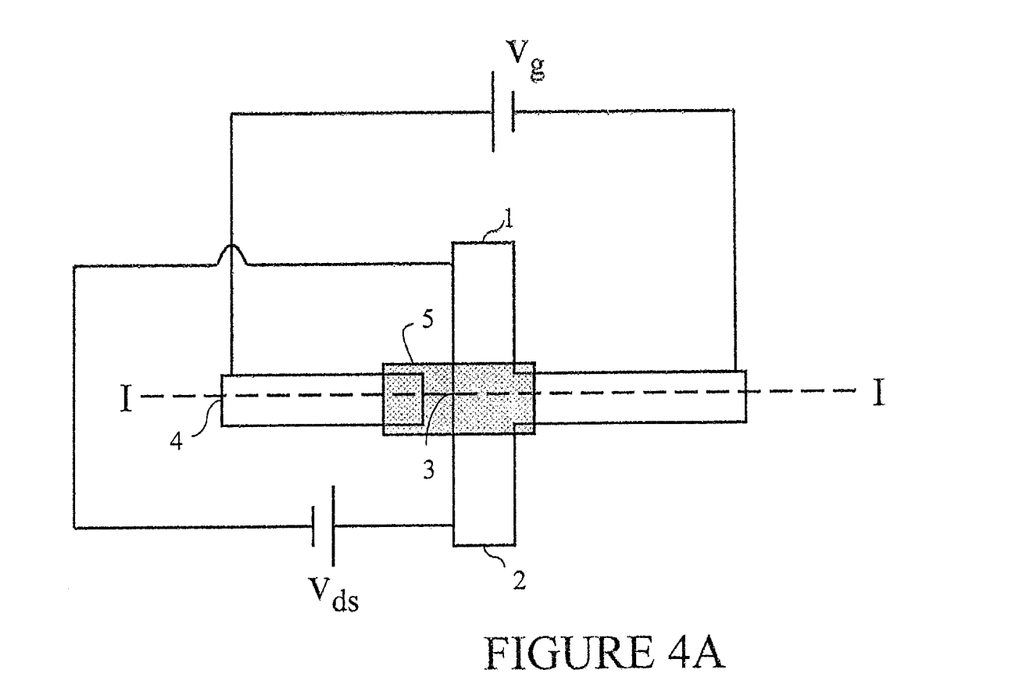
FIGS. 4A and B depict schematic top and side views of a bi-stable transistor.
Figure 4B:
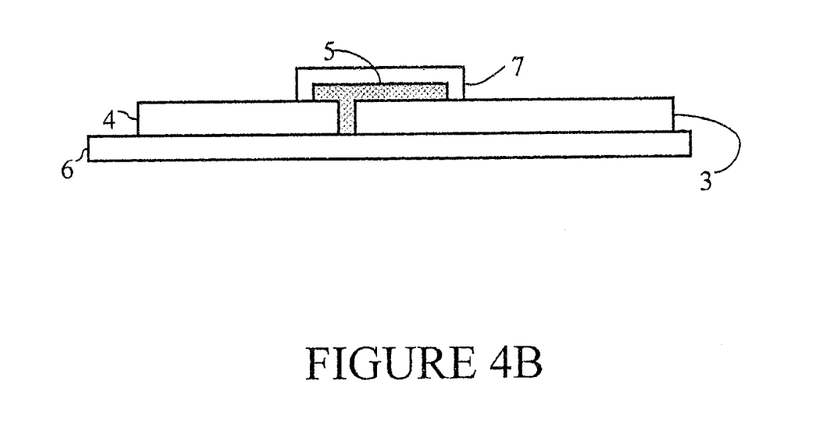

FIGS. 4A and 4B schematically show a top view and a side view, respectively, of a bi-stable transistor. The side view is taken along the line I-I. The transistor comprises a source contact 1, a drain contact 2 and a transistor portion 3, which have all been formed from a continuous piece of electrically conductive and electrochemically active material. Both the source and drain contacts are in electrical contact with an external power source, which allows the application of a voltage Vds between them. The transistor further comprises a gate electrode 4, which can be formed from the same material as the source and drain contacts and the electrochemically active element. The gate electrode 4 is in electrical contact with an external power source, which allows applying a voltage Vg between the gate electrode and the electrochemically active element. This can be realized by applying Vg between the gate 4 and the source 1 or the drain 2, or directly between the gate 4 and the transistor portion 3. All of these components of electrochemically active material have been deposited in one layer on a support 6. On top of this layer, covering or overlapping a portion of the gate electrode 4 and covering or overlapping a portion of the active element 3, is a layer of electrolyte composition 5. Furthermore, the electrolyte layer 5 is covered with an encapsulating layer 7.

Working principle for the polarity of Vg shown in FIG. 4A, and in the case of an electrochemically active material which is conducting in its oxidized state and non-conducting when reduced to its neutral state: when a gate voltage Vg is applied between the gate electrode 4 and the electrochemically active element 3, the gate electrode is polarized positive (anode), and the electrochemically active element is polarized negative (cathode). This leads to onset of electrochemistry in the electrochemically active element and at the gate electrode; the organic material in the transistor channel is reduced at the same time as an oxidation reaction takes place at the gate electrode. The reduced material in the transistor channel displays a drastically diminished electrical conductivity, which results in the closure of the transistor channel and an effective reduction of the current between source and drain for a given source-drain voltage Vds, i.e. the transistor is in an "off" mode. When the external circuit supplying voltage to the gate electrode and the electrochemically active element is broken, the oxidation state of the transistor channel is substantially maintained.

Thus, the bi-stable transistor has a memory-function: It is possible to switch on or off the transistor channel with short pulses of gate voltage, Vg, applied to the gate. The respective conductivity states remain when gate voltage is removed (a zero-power device). Further adjustments of conduction characteristics in the transistor portion, or resetting thereof to the initial, high conductivity mode, can be performed by applying different voltages to the gate electrode. For an electrochemically active material which is conducting in its reduced state and non-conducting when it is oxidized, the polarity is preferably reversed.

Figure 5:
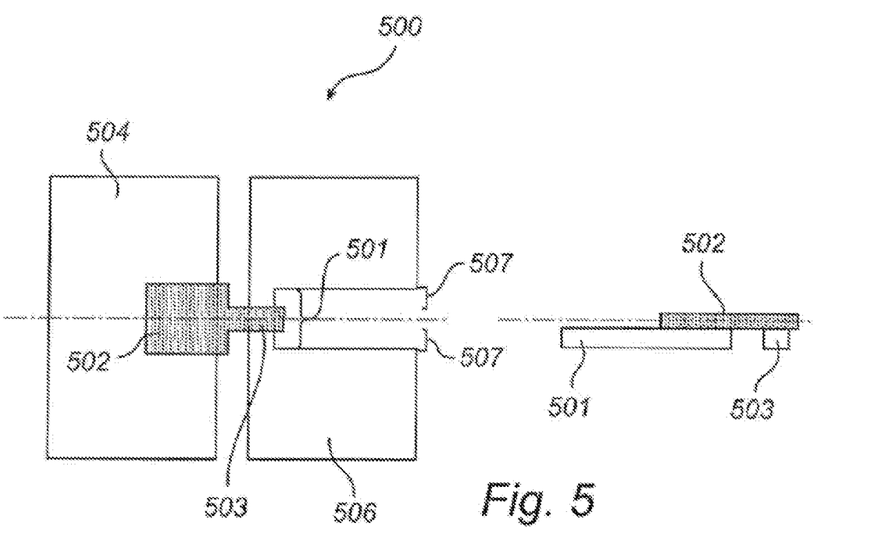
FIG. 5 depicts a 3-terminal electrochemical transistor.

An example of a three-terminal electrochemical transistor 500 is illustrated in FIG. 5 (top view on left and side view on right). The electrochemically active element 501 comprises a thin channel 507 of PEDOT:PSS on top of which the electrolyte composition 502 is deposited. The electrolyte 502 thus defines a transistor channel or transistor portion 503. The area of the transistor channel may, for example, be 0.5*0.5 mm$^2$, and the thickness may be 0.2 μm (for example using Orgacon™ EL350 foil from AGFA). The electrolyte composition 502 overlaps a more than ten times larger area on the gate electrode compared to the size of the transistor channel. This is advantageous as it prevents over-oxidizing the gate electrode. I.e. it prevents an irreversible oxidation of the gate electrode. The enlarged areas of the three terminals (i.e. the gate electrode 504, the source contact 505, and the drain contact 506) are used as "pad areas" to allow easy connection to the device.

The narrow parts 507 of the electrochemically active element that extend outside the transistor channel are kept to a minimum in order to minimize the on-resistance of the transistor. However, the existence of such parts 507 is advantageous for two reasons. First, they allow some mis-alignment of the electrolyte. The second reason is that the transistor channel reduction has a tendency to migrate somewhat outside the electrolyte-covered area. In order to limit the buildup of permanently reduced areas, this spreading process should be as confined as possible. To this end, each of the two extended portions 507 may have about the same size as the electrolyte-covered part of the transistor channel. Using PEDOT:PSS as organic material, and the dimensions given above, each of these extended portions show a resistance of about 1 kOhm.

Figure 6:
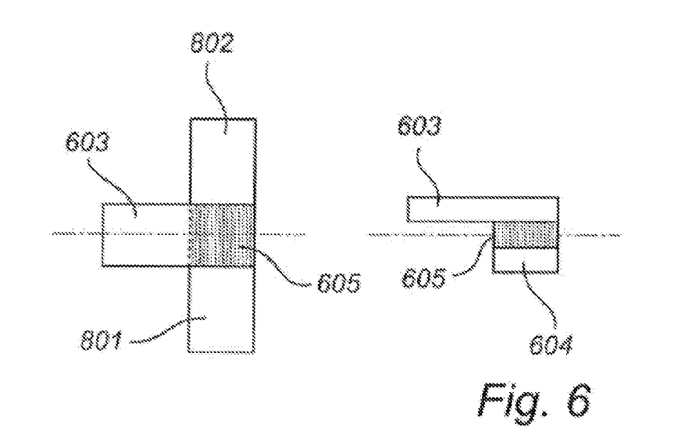
FIG. 6 depicts the differences between vertical and lateral devices.

The embodiments illustrated in FIGS. 1 to 5 are examples of a lateral devices, wherein a first layer of electrochemically active material is arranged to the side of an electrolyte covered portion of a second layer of electrochemically active material. Alternatively, a vertical design may be used, wherein the electrolyte is sandwiched between a first and a second layer electrochemically active material. In other words, in the vertical transistor the gate electrode is positioned on-top of the transistor channel. The main differences between vertical and lateral devices are illustrated in FIG. 6 (top view to the left and side view to the right). In the vertical configuration the electrolyte 605 is sandwiched between at least a portion of the gate electrode 603 and at least a portion of the electrochemically active material 604. The source and drain electrodes 801, 802 are typically arranged in the same plane as the transistor channel 604. In general, vertical transistors enable faster injection of ions into the transistor channel.

In other words, the above described transistors operate according to the same principle as the devices described in U.S. Ser. No. 10/819,306. Thus, a device in accordance with the invention may be arranged as described in U.S. Ser. No. 10/819,306, U.S. Ser. No. 10/495,653, WO 03/25953 or WO 05/27599, except that the inventive electrolyte composition should be used as electrolyte, possibly in combination with other compositions.

In the printing process it is common to consider the electrolyte as a type of ink (although, for some arrangements of the display device, it must be transparent and hence does not contain any coloring agent). As is known to the man skilled in the art, the transparency of the electrolyte is primarily an issue when the display or the electrochromic element is to be viewed through the electrolyte. In other applications, such as non-display applications (where the electrochemical device is arranged as e.g. a transistor or a sensor); or when the electrolyte is arranged on the back side of a display (e.g. when the electrochromic element is sandwiched between the substrate and the electrolyte, and display is viewed through the substrate); or when the electrolyte is arranged between the substrate and the electrochromic element, and the side of the display which faces away from the substrate is viewed; the transparency of the electrolyte is of less importance. Moreover, when the electrochemical device is not acting as a display it may be protected under a non-transparent layer, and the electrolyte may be non-transparent (i.e. absorbing and/or reflecting). Moreover, an electrochemical display may be arranged under a semi-transparent protective layer.

Printability is an important factor for the electrolyte, although the primary purpose of the electrolyte is to be conductive over the lifetime of the device. It is relatively straightforward to produce a conductive electrolyte, but to combine this with a long lifespan and printability is a more complex problem. One important parameter for the printability is the viscosity of the electrolyte composition. If the viscosity is too low, the printed electrolyte will not be confined to the desired area. If the viscosity is too high, there might be difficulties in feeding the electrolyte through the printing device. Thus, the viscosity of the printable electrolyte is preferably adapted to the intended printing device. Preferably, the viscosity is at least 0.3 Pas, or more preferably at least 0.5 Pas such that it can be printed by means of screen printing. Normally, if a composition with a lower viscosity is used for screen printing, the same area has to be printed repeatedly in order for an electrolyte with the desired/working thickness to be reached. Consequently, to be able to pattern the electrolyte on the electrochromic display it needs to be in liquid form. The electrolyte must contain ions in some form, a solvent and a medium to bind the material into a gel or solid after printing, which makes the electrolyte both conductive and printable. It is typically difficult to combine these requirements with parameters such as compatibility with adjacent materials, adhesion, scratch resistance, transparency, printability, curing and electrical properties U.S. Pat. No. 6,395,043 discloses an electrolyte formulated as a printing ink. The ink is laid down by an in-line press and is cured thermally or by UV irradiation. The ink is based on the curing of a monomer, such as acrylic acid, and contains water, an electrolyte, such as KCl, and a thickening agent. Although a thickening agent is present, it is present at less than 1% by weight and hence this electrolyte will have a very low viscosity which would make it unsuitable for most commercially viable manufacturing techniques. Techniques for increasing the viscosity without adversely affecting the other properties of the electrolyte are not disclosed.

U.S. Pat. No. 7,022,264 discloses a solid polymer electrolyte which is applied in the form of a polymerizable composition. The polymerizable composition is formulated with a non-aqueous organic solvent to provide a composition having a low water content. Again, this electrolyte will have a low viscosity.

US 2005/0068603 discloses a solidified electrolyte which is applied as a liquid which is subsequently solidified by evaporation of solvent or by curing, or is applied as a solid polymeric electrode. Minimal detail is provided regarding the composition of the solidified electrolyte.

U.S. Pat. No. 7,119,937 discloses electrolyte solutions for electrochromic devices and specifically techniques for decoloring such solutions. There is no disclosure of printable and curable compositions.

There remains a requirement in the art, therefore, for an electrolytic composition which provides a balance between printability and electrolytic properties.

According to one aspect thereof, the present invention provides a printable electrolyte composition for the production of electrochemical devices comprising:
(i) 20-50% by weight, based on the total amount of the composition, of a radiation-curable base which comprises
(a) a radiation-curable water-compatible (meth)acrylate oligomer,
(b) a (meth)acrylate monomer,
(c) a photoinitiator, and
(ii) 20-50% by weight, based on the total amount of the composition, of solvent; and (iii) 10-50% by weight, based on the total amount of the composition, of an electrolyte, wherein the composition has a viscosity of 0.3 Pas or higher.

According to a second aspect thereof the present invention provides a printable electrolyte composition for the production of electrochemical devices comprising:

20-50% by weight, based on the total amount of the composition, of a thermally curable base which comprises a resin;

20-50% by weight, based on the total amount of the composition, of solvent; and 10-50% by weight, based on the total amount of the composition, of an electrolyte, wherein the composition has a viscosity of 0.3 Pas or higher.

According to a third aspect thereof, the present invention provides a method of manufacturing an electrochemical device comprising the steps of:

providing a substrate;

arranging a first and a second layer of electrochemically active material on said substrate, wherein said layers are spatially separated from each other;

printing a layer of electrolyte composition in ionic contact with both said first and second layer of electrochemically active material, such that said first and second layers are ionically connected, wherein the electrolyte composition is arranged in accordance with said first or second aspect of the invention, and curing said electrolyte.

In the context of the invention curing encompasses the act of drying the electrolyte by means of e.g. irradiation by light or by thermal heating.

Preferably, said substrate is flexible, and arranged of paper or plastic or a combination thereof.

According to one embodiment the device is cured by irradiating said electrolyte composition by actinic radiation and preferably UV-radiation, alternatively the electrolyte is cured by means of thermal radiation.

According to a fourth aspect thereof, the present invention provides a electrochemical device comprising:

a flexible substrate;

a first and a second layer of electrically conductive and electrochemically active material, which layers are spatially separated from each other and carried by said flexible substrate, an electrolyte composition, resulting from the drying of an electrolyte composition arranged in accordance with said first or second aspect of the invention, which electrolyte composition ionically connects said first and second layer;

wherein the redox state and the electrical conductivity of said first layer is controllable by means of a voltage applied across said electrolyte.

According to one embodiment the device has a vertical structure, wherein the electrolyte composition is sandwiched between said first and second layers of electrochemically active material. This is advantageous as a vertical structure normally provides a less energy consuming device with faster switching times. The shorter response times are e.g. due to that the average ion path between said first and second layers are shorter.

According to an alternative embodiment, the device has a lateral structure i.e. the electrolyte composition is in ionic contact with a respective surface of said first and second layers, wherein said surfaces face the same direction. In other words, in a lateral structure the first layer of electrochemically active material is arranged to the side of a second layer of electrochemically active material. According to one embodiment said first and second layers are arranged in a common plane Preferably, the electrolyte composition overlaps or covers at least a respective portion of said first and second electrochemical layer. According to one embodiment the electrolyte composition covers only a portion of said first layer and only a portion of said second layer. According to an alternative embodiment the electrolyte composition covers substantially the whole of said first and/or second layer.

Optionally, two or more electrochemical devices may be stacked on top of each other, wherein two neighboring devices preferably are separated by an isolating layer The at least one of said first and second layer is preferably arranged of electrically conductive polymer, which may or may not be electrochromic. The electrically conductive polymer is preferably arranged as a conductive polymer film.

Optionally, the device may be provided with an encapsulation covering the electrolyte, e.g. in such a manner as was described above. This is particularly advantageous when the solvent comprises water and a ionic solid is used a electrolyte, as the encapsulation ensures the water content of the composition which normally improves the ionic conductivity. The two most preferred encapsulation techniques used are varnishing and lamination. The printing of a varnish is advantageous as it facilitates the application of the protective layer locally on the substrate. Laminates are advantageous as they sometimes are easier to handle. By way of an example, polypropylene (PP) tape may be laminated over the electrolyte. Preferably, the encapsulation protects the device from deteriorating interaction with UV-radiation. A protection against UV-radiation can be achieved by adding UV-absorbers to the varnish, or by using an UV-absorbing laminate as encapsulation. Further, the encapsulation is preferably flexible and compatible with rest of the components.

The composition described in relation to the above aspects of the invention allows for the printing or deposition of an electrolyte that preferably cures almost instantly, is mechanically stable, has good adhesion to e.g. a layer of conductive polymer, has the ability to retain a solvent such as water and provides an electrochromic device and/or electrochemical device having a long lifetime and good performance (short switch time) under all ambient conditions (in particular low relative humidity).

According to one embodiment of the invention the composition is thermally curable. In relation to this invention, this means that solidification and insolubilization of the print-deposited composition takes place as a consequence of evaporation of the solvents from the composition, either at ambient temperature or at elevated temperatures Suitable solvents for the thermally cured electrolyte composition may e.g. be selected from a group comprising: aromatic hydrocarbons, aliphatic hydrocarbons, ketones, esters, glycol ethers, glycol ether esters, butyl oxitol, butyl oxitol acetate, butyl propanol acetate, ethyl propyl acetate, methoxy propanol, water and combinations thereof. Specific examples of suitable solvents comprise: whitespirit, Shellsol A, Shellsol 150, Shellsol 200, Shellsol T, SBP6, SBP11, cyclohexanone, butyrolactone and distilled water. Dependent on the specific selection of solvent or combination of solvents, e.g. the drying speed and adhesion can be adjusted.

When water is used as solvent, a combination of a thickener, which raises the viscosity, and a wetting agent, which lowers the surface tension, is advantageously added to the composition. This is useful both for radiation curable and thermally curable electrolyte compositions, and both for electrolytes comprising ionic liquids and ionic solids or a combination of these. According to one embodiment the resin is provided as an emulsion in water, comprising a thickener and a wetting agent. Examples of suitable wetting agents are given below, in relation to the radiation curable electrolyte composition. Preferably the wetting agent is present from 0.1 to 20% by weight, preferably from 1 to 10% by weight, of the curable base.

According to one embodiment the amount of solvent in the thermally curable composition is between about 40% and about 70% by weight, based on the total weight of the curable base. If too much solvent is used, the conductivity per surface area of the printed electrolyte will not be sufficient.

According to one embodiment the electrolyte of the thermally cured electrolyte composition comprises an ionic liquid. Ionic liquids or ionic liquid solutions are advantageous as they normally provide a significantly longer life time of the electrochemical device, and may be ionically conductive also at low relative humidity. In other words, ionic liquids can provide a good ionic conductivity although the amount of solvent in the electrolyte composition after curing is very low. As used herein, the term ionic liquid solution includes mixtures of ionic liquids and solutions of ionic solids dissolved in an ionic liquid. An example of the latter solution is $LiClO_4$ dissolved in [BMIM] [BF4]. Further, examples of conjugated polymers suitable for use in electrochemical devices are e.g. the polymers: polyphenylene, polyphenylenevinylene, polyphenylenesulfide, polyfluorene, polypyridine, polypyridalvinylene, polypyrrole, polyaniline, polythiophene, polythiophenevinylene, polyfuran, polyacetylene, polyquinone, polyantraquinone, polycarbazole, polyindole, pollythioazole and derivatives thereof. Moreover, ionic liquids may also based on various monocations, such as pyridinium, pyridazinium, pyrimidinium, pyraxinium, imidazolium, pyrazolium, thriazolium, oxaxolium, triazolium, ammonium, pyrrolidinium, pyrrolinium, pyrrolium, piperidinium. Additionally, ionic liquids may also be based on various polycations, such as polypyrrole, polyaniline, polythiophene, polythiophenevinylene, polyfuran, polyquinone.

Figure 7A:
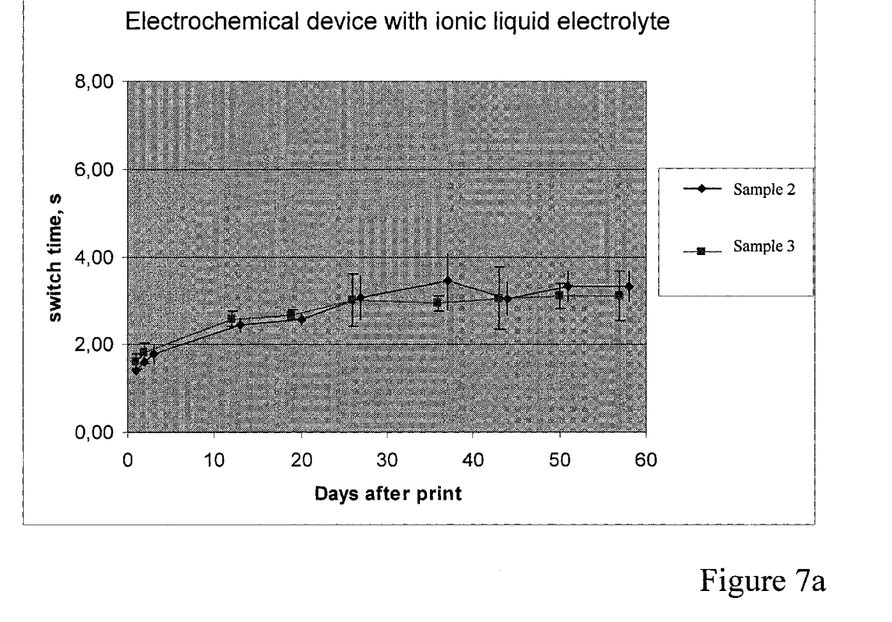
FIG. 7a is a graph depicting variation in switch time with days after printing.
Figure 7B:
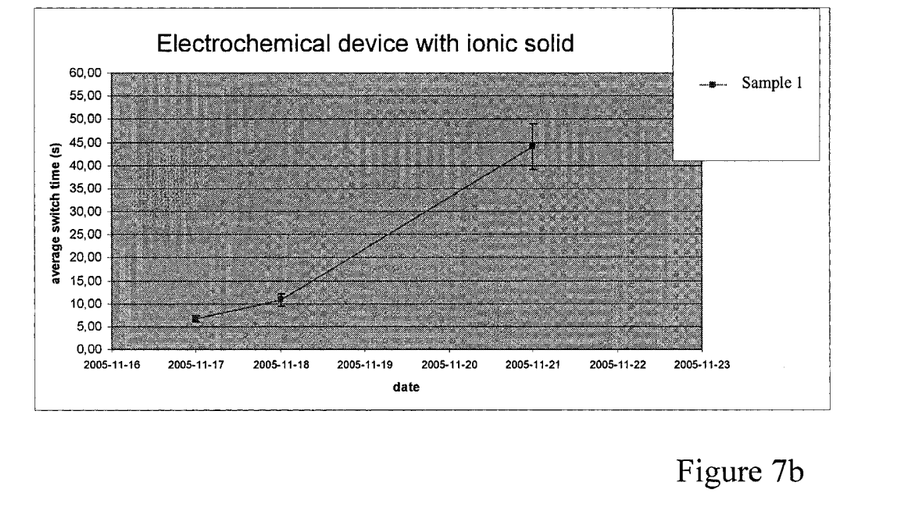
FIG. 7b depicts variation in average switch time with time after printing.

FIG. 7b illustrates the performance of an electrochromic device comprising an electrolyte composition according to the invention, where the electrolyte is NaCl. The electrolyte device was formed as described in relation to FIGS. 1-3. The graph illustrates that the device deteriorates quickly, i.e. the switching speed increases from about 6 s to about 45 s already after four days.

FIG. 7a illustrates the performance of a two devices, which each are equal to the device used in relation to the experiment which is illustrated in FIG. 7b except that in both devices the electrolyte was ionic liquid (EMIM-ES) and not NaCl. The graph clearly shows that the switching time of the device is remains substantially the same (i.e. within 2-3.5 s) for a period of more than 50 days. Consequently, an electrochemical device comprising ionic liquids provides a low switching time substantially longer compared to ionic solids.

According to another embodiment the electrolyte is an ionic solid. Thus, the electrolyte may be an ionic solid or an ionic liquid and may be organic or inorganic. The electrolyte may be an inorganic electrolyte such as and alkali metal halide, e.g. KCl. Organic electrolytes may contain an organic cation, such as a quaternary ammonium and/or phosphonium salts having alkyl and/or aryl substituents, optionally further substituted, e.g. with halo, alkyl ($C_1$-$C_8$), hydroxyl, amine, etc.), e.g. tetrabutyl, tetraoctyl, or tetracetylammonium salts; or a nitrogen-containing heterocycle, such as imidazolium or pyridinium, e.g. methyl-octyl-imidazolium chloride, butyl-methyl-imidazolium-bis-trifluoromethane sulfonimide. Alternatively or in addition the organic electrolytes may contain an organic anion, such as alkylsulfate, trifluorocarboxylic acid, organic sulfonate, organic phosphate or organic phosphonate. Counter ions for the organic cations include halides (chlorides, iodides, bromides, fluorides), nitrates, nitrites, tetrafluoroborates, hexafluorophosphates, trifluoromethanesulfonates and other polyfluoroalkanesulfonates, e.g. nonaflate, bis(trifluoromethylsulfonyl)imides, methylsulfates, acetates, fluoroacetates and other anions of fluoroalkanoic acid. The electrolyte is retained in the cured composition and an electrolyte cured by actinic radiation hence must be stable in the presence of said radiation used to cure the composition.

According to one embodiment the electrolyte is an ionic solid and the solvent comprises water. This is advantageous, as there is a wide range of water-soluble ionic solids which provides good high ionic conductivity.

According to one embodiment, the present invention provides an electrolyte composition for an electrochromic device comprising
(i) 20-50% by weight, based on the total amount of the composition, of a radiation-curable base which comprises
(a) a radiation-curable water-compatible (meth)acrylate oligomer,
(b) a (meth)acrylate monomer,
(c) a photoinitiator, and
(d) a wetting agent;
(ii) 20-50% by weight, based on the total amount of the composition, of water; and
(iii) 10-50% by weight, based on the total amount of the composition, of an electrolyte,
wherein the composition has a viscosity of 0.5 Pas or higher.

The composition of the present invention thus comprises the following components: a curable base, solvent and an electrolyte. Each of these components will be considered in turn.

According to one embodiment the radiation curable base contains a radiation-curable (meth)acrylate oligomer, a (meth)acrylate monomer, a photoinitiator and preferably a wetting agent. The (meth)acrylate oligomer is preferably water-compatible. The composition contains at least 20% by weight, preferably at least 30% by weight and most preferably at least 35% by weight, and 50% or less by weight, preferably 45% or less by weight, of curable base based on the total amount of the composition. According to one embodiment the oligomer is present at 40-95% by weight, based on the total amount of the curable base. The radiation-curable (meth)acrylate oligomer is a curable oligomeric component and such materials are commercially available. One or more oligomers may be used. The oligomer may be selected from a polyester (meth)acrylate, an epoxy (meth)acrylate, a urethane (meth)acrylate or mixtures thereof. A urethane (meth)acrylate is particularly preferred and examples include Craynor CNSP061 (a water-soluble aliphatic urethane acrylate supplied by Sartomer having Mw 7800), Craynor CNSP066 (a water-soluble aliphatic urethane acrylate supplied by Sartomer having Mw 6000), Photocryl DP266 (an 80:20 mix of water-soluble aliphatic urethane acrylate and DPGDA supplied by PC Resin GmbH) and IRR569 (an acrylated resin supplied by Cytec).

The term "oligomer" has its standard meaning in the art, namely that the component is partially polymerized to form a pre-polymer which is capable of further polymerization. The oligomers of the present invention has a weight-average molecular weight (Mw) of 500-25,000. Preferably the weight-average molecular weight is 750 or higher and most preferably 1000 or higher. Preferably the weight-average molecular weight is 15,000 or less, more preferably 10,000 or less and most preferably 8,000 or less. The Mw may be measured by known techniques in the art, such a gel permeation chromatography (GPC).

A suitable GPC apparatus for measuring Mw is an LC instrument having the following parameters—Column set: MiniMix E or MiniMix D (depending on molecular weight), Eluent: THF, Detector: UV/vis and/or ELS, Calibration: conventional vs polystryrene. This approach is applicable to polymers having a Mw of 400-400,000.

By water-compatible is meant that the oligomer is either soluble in water or capable of forming a stable suspension, i.e. a dispersion which does not separate (settle), i.e. the radiation-curable water-compatible (meth)acrylate oligomer has a water compatibility such that the oligomer is soluble in water or is capable of forming a stable dispersion in water. The water compatibility is therefore a function of the chemical nature and the amount of the oligomer. Only oligomers which are water-soluble or dispersible in the amount used in the composition are suitable for use in the present invention. For example, DP266 is soluble in water up to about 300 g/L and beyond that quantity the product will emulsify but form a stable dispersion (i.e. no separation). Only beyond about 500 g/L will the dispersion become unstable. Thus, provided that the DP266 is used in an amount within the soluble or stably dispersible range, it is suitable for use in the present invention. Preferably the oligomer has a water solubility of at least 50 g/L, more preferably at least 100 g/L measured at 25° C.

The oligomer may be mono or multifunctional (preferably di, tri, or tetrafunctional). Mono and multifunctional are intended to have their standard meanings, i.e. one and two or more groups, respectively, which take part in the polymerization reaction on curing. Such materials are well-known in the art.

The composition preferably contains 40 to 95% by weight of oligomer based on the total weight of the curable base. Preferably the composition contains at least 50% by weight and most preferably at least 60% by weight, based on the total weight of the curable base. Preferably the composition contains 90% or less by weight and most preferably 85% or less by weight, based on the total weight of the curable base.

The composition of the present invention also contains one or more radiation-curable (meth)acrylate monomers. The monomer may be multifunctional or monofunctional or a mixture thereof. Mono and multifunctional are intended to have their standard meanings, i.e. one and two or more groups, respectively, which take part in the polymerization reaction on curing. Such materials are well-known in the art.

Examples of the multifunctional acrylate monomers which may be included in the composition of the present invention include hexanediol diacrylate, trimethylolpropane triacrylate, pentaerythritol triacrylate, polyethylene glycol diacrylate, for example, tetraethylene glycol diacrylate), dipropylene glycol diacrylate, tri(propylene glycol) triacrylate, neopentyl glycol diacrylate, bis(pentaerythritol) hexaacrylate, and the acrylate esters of ethoxylated or propoxylated glycols and polyols, for example, propoxylated neopentyl glycol diacrylate, ethoxylated trimethylolpropane triacrylate, and mixtures thereof.

In addition, suitable multifunctional acrylate monomers include esters of methacrylic acid (i.e. methacrylates), such as hexanediol dimethacrylate, trimethylolpropane trimethacrylate, triethyleneglycol dimethacrylate, diethyleneglycol dimethacrylate, ethyleneglycol dimethacrylate, 1,4-butanediol dimethacrylate.

The monofunctional (meth)acrylate monomers are also well known in the art and are preferably the esters of acrylic acid. Preferred examples include phenoxyethyl acrylate (PEA), cyclic TMP formal acrylate (CTFA), isobornyl acrylate (IBOA), tetrahydrofurfuryl acrylate (THFA), 2-(2-ethoxyethoxy)ethyl acrylate, octadecyl acrylate (ODA), tridecyl acrylate (TDA), isodecyl acrylate (IDA) and lauryl acrylate Mixtures of (meth)acrylates may also be used. Water-solubility is not essential for the monomer since the water-compatibility of the oligomer assists with the incorporation of the monomer into the composition. However, the monomer is preferably water-soluble. Preferably the monomer has a solubility of at least 50 g/L, more preferably at least 100 g/L measured at 25° C., and most preferably the monomer is water-miscible, i.e. soluble in water in all proportions. The weight-average molecular weight is typically below 500.

[0084] The total amount of the (meth)acrylate monomer present in the composition is preferably at least 3% by weight, more preferably at least 5% by weight, based on the total weight of the curable base, and preferably no more than 30% by weight, more preferably no more than 25% by weight, most preferably no more than 20% by weight based on the total weight of the base. According to one embodiment the monomer is present at 3-30% by weight, based on the total amount of the curable base.

(Meth)acrylate is intended herein to have its standard meaning, i.e. acrylate and/or methacrylate.

In addition to the monomers described above, the radiation-cureable base include a photoinitiator, which, under irradiation, for example with UV light, initiates the polymerisation of the monomers and oligomers. Preferred are photoinitiators are free radical photoinitiators, such as benzophenone, 1-hydroxycyclohexyl phenyl ketone, 2-benzyl-2-dimethylamino-(4-morpholinophenyl)butan-1-one, benzil dimethylketal, bis(2,6-dimethylbenzoyl)-2,4,4-trimethylpentylphosphine oxide or mixtures thereof. Such photoinitiators are known and commercially available such as, for example, under the trade names Irgacure, Darocur (from Ciba) and Lucerin (from BASF). The wavelength of the radiation and the nature of the photoinitiator system used must of course coincide.

The photoinitiator may be used in the presence or absence of a synergist. Preferably the composition does not contain a synergist. Amine-containing synergists have a tendency to discolor the composition and should preferably be avoided.

Preferably the photoinitiator is present from 1 to 20% by weight, preferably from 8 to 12% by weight, of the curable base.

Preferably, the composition also contains a wetting agent. Examples include silicone oils, such as Dow Corning 200, 300, etc; modified siloxanes, modifications include amino, polyester, polyether, available from Tego, BYK Chemie etc.; fluoro surfactants, such as Zonyl FSN available from DuPont; mineral oils, such as BYK-035 available from BYK Chemie; non-ionic organic surfactants such as Tego Wet 510 from Tego; and polymeric additives, such as acrylic copolymers such as Modarez MFP from Synthron. The wetting agent improves the planerisation and the split of the printed ink. The wetting agent also contributes to the retention of the water or solvent in the cured composition.

Preferably the wetting agent is present from 0.1 to 20% by weight, preferably from 1 to 10% by weight, of the curable base.

The composition contains a solvent, e.g. an organic solvent or water. The solvent forms part of the liquid vehicle of the composition. In addition, the solvent is present after curing of the composition allowing the movement of ions (of the electrolyte) through the composition. The solvent, e.g. water is present at 20-50% by weight, preferably 30-40% by weight based on the total amount of the composition. The solvent might be an organic solvent or water, or a combination an organic solvent and water.

For UV-radiation curable electrolyte compositions suitable solvents, besides water, are e.g. glycolethers and glycolether acetates. Preferably, the solvent is highly oxygenated such in order to prolong the lifetime of the UV radiation source, by avoiding the build up of carbon deposits on the external surface of the UV radiation source.

The presence of a water-compatible oligomer, a water-soluble monomer and a wetting agent in the curable base is advantageous as it leads to the retention of significant quantities of water in the cured composition. The amount retained is sufficient to allow for the confined transport of ions within the cured electrolyte composition.

As used herein the term electrolyte normally refers to a substance that at least when dissolved in a suitable solvent is or becomes an ionic conductor. Further, the term electrolyte composition refers to a solution comprising the electrolyte. In order to facilitate the reading the term electrolyte is sometimes used instead of electrolyte composition.

The electrolyte may be an ionic solid or an ionic liquid and may be organic or inorganic. The electrolyte may be an inorganic electrolyte such as and alkali metal halide, e.g. KCl. Organic electrolytes may contain an organic cation, such as a quaternary ammonium and/or phosphonium salts having alkyl and/or aryl substituents, optionally further substituted, e.g. with halo, alkyl ($C_1$-$C_8$), hydroxyl, amine, etc.), e.g. tetrabutyl, tetraoctyl, or tetracetylammonium salts; or a nitrogen-containing heterocycle, such as imidazolium or pyridinium, e.g. methyl-octyl-imidazolium chloride, butyl-methyl-imidazolium-bis-trifluoromethane sulfonimide. Alternatively or in addition the organic electrolytes may contain an organic anion, such as alkylsulfate, trifluorocarboxylic acid, organic sulfonate, organic phosphate or organic phosphonate. Counter ions for the organic cations include halides (chlorides, iodides, bromides, fluorides), nitrates, nitrites, tetrafluoroborates, hexafluorophosphates, trifluoromethanesulfonates and other polyfluoroalkanesulfonates, e.g. nonaflate, bis(trifluoromethylsulfonyl)imides, methylsulfates, acetates, fluoroacetates and other anions of fluoroalkanoic acid. The electrolyte is retained in the cured composition and an electrolyte cured by actinic radiation hence must be stable in the presence of said radiation used to cure the composition.

Ionic liquids or ionic liquid solutions are advantageous as they provide a significantly longer life time of the electrochemical device, and may be ionically conductive also at low relative humidity. As used herein, the term ionic liquid solution includes mixtures of ionic liquids and solutions of ionic solids dissolved in an ionic liquid. An example of the latter solution is $LiClO_4$ dissolved in [BMIM] [BF4]. Further, examples of conjugated polymers suitable for use in electrochemical devices are e.g. the polymers: polyphenylene, polyphenylenevinylene, polyphenylenesulfide, polyfluorene, polypyridine, polypyridalvinylene, polypyrrole, polyaniline, polythiophene, polythiophenevinylene, polyfuran, polyacetylene, polyquinone, polyantraquinone, polycarbazole, polyindole, pollythioazole and derivatives thereof. Moreover, ionic liquids may also based on various monocations, such as pyridinium, pyridazinium, pyrimidinium, pyraxinium, imidazolium, pyrazolium, thriazolium, oxaxolium, triazolium, ammonium, pyrrolidinium, pyrrolinium, pyrrolium, piperidinium. Additionally, ionic liquids may also be based on various polycations, such as polypyrrole, polyaniline, polythiophene, polythiophenevinylene, polyfuran, polyquinone.

The electrolyte is present at 10-50% by weight, preferably 20-40% by weight. Electrolytes are well-known in the art. The electrolyte is preferably hygroscopic to assist in retaining water in the cured composition.

According to one embodiment the composition of the present invention is transparent after curing. This is advantageous when the display is viewed through the electrolyte and maximum contrast is desired. Since the electrolyte is used as part of an electrochromic device and the cured electrolyte must be sufficiently transparent to allow the user to see the color change in the conductive film below. By transparent is meant transparent to the user, i.e. under visible light. Accordingly, the composition is substantially free of coloring agents, including both dissolved and dispersed coloring agents (pigments, dyes etc). By substantially free is meant that traces of coloring agents may be tolerated provided they do not interfere with the visualization of the color change occurring in the conductive film. Considerable effort has been expended in finding materials which have the balance of printability and electrolytic properties but which are still transparent after curing.

According to another embodiment, the electrolyte is non-transparent or semi-transparent. Such electrolytes are normally not used for the display applications where the display is viewed through the electrolyte, but for other display applications and for other types of electrochemical components.

Other components of types known in the art of ink formulation may be present in the thermally curable or radiation curable compositions to improve the properties or performance. These components may be, for example, defoamers, rheology modifiers, synergists for the photoinitiator, stabilizers against deterioration by heat or light, reodorants, biocides etc. The requirement for transparency must, however, be met.

The composition of the present invention has a viscosity of at least 0.5 Pas (5 poise), more preferably at least 1 Pas (10 poise) and most preferably about 2.5 Pas (25 poise) at 25° C., prior to curing. Viscosity may be determined using a Sheen Rotothinner available from Sheen Instruments operating at a shear rate of 80 s-1. The control over the viscosity may be achieved by balancing the amount of oligomer and thickening agent (increases the viscosity), and the monomer and water or solvent (decrease the viscosity).

The electrolyte may be printed using a range of printing methods including flexo, screen, offset and gravure printing. Screen printing is particularly preferred.

The composition of the invention may be prepared by known methods such as, for example, stirring with a high-speed water-cooled stirrer, or milling on a horizontal bead-mill.

The present invention also provides a method of manufacturing an electrochromic device comprising the steps of providing a substrate having a patterned conductive polymer film thereon, printing the electrolytic composition as described herein on to the film and heating the composition or irradiating the composition with actinic radiation to cure the composition. The cured film contains components not previously disclosed in an electrochromic device and hence the present invention also provides an electrochromic device per se which is obtainable by the above-described method.

According to an alternative manufacturing process the electrolyte composition is provided on the substrate, before the electrochemically active material is arranged thereon.

EXAMPLES

The electrolyte composition of the invention will now be described, by way of example, with reference to the following example (parts given are by weight).

Example 1

A UV-curable base for formulating a composition according to the present invention was prepared by combining the following components in the following quantities.

| Component | | wt % |
|---|---|---|
| CN SP061 | (Oligomer) | 68.15 |
| Craynor 434 | (Acrylate monomer) | 7.13 |
| Irgacure 184 | (Photoinitator) | 3.72 |
| Lucerin TPO | (Photoinitator) | 3.72 |
| Benzophenone | (Photoinitator) | 3.72 |
| PEG 1500 | (Humectant) | 3.72 |
| Caflon PHC080 | (Surfactant) | 1.67 |
| Silicone Fluid | (Flow aid) | 1.86 |
| Aerosil 200 | (Rheology modifier) | 1.1 |
| Byk defoamer 035 | (Flow aid) | 0.56 |
| Alcoprint PTF | (Rheology modifier) | 3.72 |
| Genorad 16 | (Stabilizer) | 0.93 |
| | | 100.0 |

Example 2

A UV-curable base for formulating a composition according to the present invention was prepared by combining the following components in the following quantities.

| Component | wt % |
|---|---|
| CN SP066 | 68.15 |
| Craynor 434 | 7.13 |
| Irgacure 184 | 3.72 |
| Lucerin TPO | 3.72 |
| Benzophenone | 3.72 |
| PEG 1500 | 3.72 |
| Caflon PHC080 | 1.67 |
| Silicone Fluid | 1.86 |
| Aerosil 200 | 1.1 |
| Byk defoamer 035 | 0.56 |
| Alcoprint PTF | 3.72 |
| Genorad 16 | 0.93 |
| | 100.0 |

Example 3

A UV-curable base for formulating a composition according to the present invention was prepared by combining the following components in the following quantities.

| Component | wt % |
|---|---|
| DP266 | 68.15 |
| Craynor 434 | 7.13 |
| Irgacure 184 | 3.72 |
| Lucerin TPO | 3.72 |
| Benzophenone | 3.72 |
| PEG 1500 | 3.72 |
| Caflon PHC080 | 1.67 |
| Silicone Fluid | 1.86 |
| Aerosil 200 | 1.1 |
| Byk defoamer 035 | 0.56 |
| Alcoprint PTF | 3.72 |
| Genorad 16 | 0.93 |
| | 100.0 |

Example 4

A UV-curable base for formulating a composition according to the present invention was prepared by combining the following components in the following quantities.

| Component | wt % |
|---|---|
| IRR569 | 68.15 |
| Craynor 434 | 7.13 |
| Irgacure 184 | 3.72 |
| Lucerin TPO | 3.72 |
| Benzophenone | 3.72 |
| PEG 1500 | 3.72 |
| Caflon PHC080 | 1.67 |
| Silicone Fluid | 1.86 |
| Aerosil 200 | 1.1 |
| Byk defoamer 035 | 0.56 |
| Alcoprint PTF | 3.72 |
| Genorad 16 | 0.93 |
| | 100.0 |

Example 5

A particularly preferred UV-curable base for formulating a composition according to the present invention was prepared by combining the following components in the following quantities.

| Component Amount | (g) | wt % |
|---|---|---|
| Actilane SP061 | 27.9 | 65.5 |
| Craynor 43 | 2.88 | 6.7 |
| Irgacure 184 | 1.5 | 3.5 |
| Lucerin TPO | 3.75 | 8.8 |
| Benzophenon | 1.5 | 3.5 |
| PEG 1500 | 1.5 | 3.5 |
| Caflon PHC080 | 0.66 | 1.5 |
| Silicone | 0.75 | 1.8 |
| Aerosil | 0.45 | 1.1 |
| Defoamer 035 | 0.23 | 0.5 |
| Alcoprint thickener | 1.5 | 3.5 |
| | 42.62 | 100 |

Example 6

Two UV-curable compositions of the present invention were prepared by combining the following components.

| Component | wt % |
|---|---|
| UV-base | 45 |
| Water | 35 |
| BMIM-Cl* (CAS 79917-90-1) | 20 |
| | 100.0 |

*1-butyl-3-methyl-1H-imidazolium chloride

| Component | wt % |
|---|---|
| UV-base | 36 |
| Water | 36 |
| EMIM-ES* (CAS 342573-75-5) | 27 |
| | 100.0 |

*1-ethyl-3-methyl-1H-imidazolium ethyl sulfate

The "UV-base" was the curable base from Example 5.

Example 7

A thermally curable base for formulating a composition comprising an organic solvent according to the present invention was prepared by combining the following components in the following quantities.

| Component | wt % | |
|---|---|---|
| EFKA 7215 | 0.1 | (surfactant) |
| Synolac 8185 S90 | 7.1 | (resin) |
| N/C chip H22.5 in 20% ATBC* | 21.1 | (resin) |
| Solvent Naphta 160/185 | 2.1 | (solvent) |
| Isopropyl oxitol acetate | 3.2 | (solvent) |
| Methoxy Propanol | 13.2 | (solvent) |
| Propyl Glycol | 13.2 | (solvent) |
| EMIM-ES** | 20 | (electrolyte) |
| | 100.0 | |

*ATBC = Acetyl TriButyl Citrate
**EMIM-ES = 1-*Ethyl-3-metylimidazolium etyl sulfate, CAS number [342573-75-5]

According to an alternative example a thinner was added to the composition described in relation to the above example.

| Component | wt % | |
|---|---|---|
| ZC 530 | 17.70 | (thinner) |
| EFKA 7215 | 0.13 | (surfactant) |
| Synolac 8185 S90 | 5.84 | (resin) |
| N/C chip H22.5 in 20% ATBC* | 17.42 | (resin) |
| Solvent Naphta 160/185 | 18.25 | (solvent) |
| Isopropyl oxitol acetate | 2.67 | (solvent) |
| Methoxy Propanol | 10.92 | (solvent) |
| Propyl Glycol | 10.77 | (solvent) |
| EMIM-ES** | 16.30 | (electrolyte) |
| | 100.0 | |

The invention has mainly been described above with reference to a number of explicitly disclosed embodiments. However, as is readily appreciated by a person skilled in the art, other embodiments than the ones disclosed above are equally possible within the scope of the invention, as de-fined by the appended patent claims. The display may e.g. have a vertical design. The electrochemically active material need not be an organic polymer. The electrolyte may be applied to other devices than those described without leaving the scope of the invention. These devices should preferably be based on the same principles as the devices described herein. The solvents are not to be limited to the specific examples given, but can be any solvent which provide suitable volatility, solvency for the resin as well as preferably provides low toxicology.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise.

What is claimed is:

1. An electrochemical device, comprising:
    a flexible substrate;
    a first and a second layer of electrically conductive and electrochemically active material, which are spatially separated from each other and carried by said flexible substrate;
    an electrolyte composition, which ionically connects said first and said second layer,
    wherein the redox state of said first layer is controllable by means of a voltage applied across said electrolyte composition, and wherein said first layer is arranged such that a change in the redox state alters the electrical conductivity of said first layer, and
    the electrolyte composition includes, before drying and curing,
    (i) 20-50% by weight, based on the total amount of the electrolyte composition, of a radiation-curable base which comprises
        (a) a radiation-curable (meth)acrylate oligomer,
        (b) a (meth)acrylate monomer, and
        (c) a photoinitiator,
    (ii) 20-50% by weight, based on the total amount of the electrolyte composition, of water, and
    (iii) 10-50% by weight, based on the total amount of the electrolyte composition, of an electrolyte, wherein the electrolyte composition has a viscosity of 0.3 Pas or higher.

2. A device according claim 1, wherein said electrolyte composition is sandwiched between said first and second layer.

3. A device according to claim 2, wherein said electrolyte composition is in contact with a respective surface of said first and second layer, wherein said surfaces faces the in same direction.

4. A device according to claim 1, wherein said first electrochemically active material is arranged to the side of said second electrochemically active material.

5. A device according to claim 1, wherein said electrolyte composition overlaps a portion of said first electrochemically active material as well as a portion of said second electrochemically active material.

6. A device according to claim 1, wherein said substrate is made of paper or plastic or a combination thereof.

7. A device according to claim 1, wherein said electrochemically active material comprises an electrically conductive polymer.

8. A device according to claim 7, wherein said electrically conductive polymer is electrochromic.

9. A device according to claim 1, wherein said device is a transistor.

10. A device according to claim 1 further comprising an encapsulation covering the electrolyte composition.

11. A method of manufacturing an electrochemical device comprising the steps of:
    providing a flexible substrate carrying a first and a second layer of electrically conductive and electrochemically active material, wherein said layers are spatially separated from each other;
    printing a layer of a printable electrolyte composition,
        wherein the printable electrolyte composition ionically connects the first and second layer, and
        wherein the printable electrolyte composition includes, before drying and curing,
        (i) 20-50% by weight, based on the total amount of the composition, of a radiation-curable base which comprises
            (a) a radiation-curable (meth)acrylate oligomer,
            (b) a (meth)acrylate monomer, and
            (c) a photoinitiator,
        (ii) 20-50% by weight, based on the total amount of the composition, of water, and (iii) 10-50% by weight, based on the total amount of the composition, of an electrolyte, wherein the composition has a viscosity of 0.3 Pas or higher; and curing the printable electrolyte composition by irradiating the printable electrolyte composition with actinic radiation, wherein a redox state of said first layer is controllable by means of a voltage applied across said printable electrolyte composition, and wherein said first layer is arranged such that a change in the redox state of the first layer alters the electrical conductivity of said first layer.

12. A method of manufacturing according to claim 11, wherein the actinic radiation is UV radiation.

13. A method of manufacturing according claim 11, further comprising the step of arranging an encapsulation covering said electrolyte.

14. A method of manufacturing according claim 11, wherein said electrochemically active material is a conductive polymer film.

* * * * *